US011359099B2

(12) United States Patent
Brown et al.

(10) Patent No.: US 11,359,099 B2
(45) Date of Patent: *Jun. 14, 2022

(54) HYDROPHOBIC EXTENDERS IN FLUORINATED SURFACE EFFECT COATINGS

(71) Applicant: THE CHEMOURS COMPANY FC, LLC, Wilmington, DE (US)

(72) Inventors: Gerald Oronde Brown, Swedesboro, NJ (US); John Christopher Sworen, Lincoln University, PA (US); Tess Crosetto, Philadelphia, PA (US); Charles Karanja, Newark, DE (US)

(73) Assignee: THE CHEMOURS COMPANY FC, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/764,933

(22) PCT Filed: Sep. 30, 2016

(86) PCT No.: PCT/US2016/054600
§ 371 (c)(1),
(2) Date: Mar. 30, 2018

(87) PCT Pub. No.: WO2017/059169
PCT Pub. Date: Apr. 6, 2017

(65) Prior Publication Data
US 2018/0273774 A1    Sep. 27, 2018

Related U.S. Application Data

(60) Provisional application No. 62/236,329, filed on Oct. 2, 2015.

(51) Int. Cl.
| | | |
|---|---|---|
| C09D 7/63 | (2018.01) |
| C08F 220/24 | (2006.01) |
| C09D 5/16 | (2006.01) |
| C09D 7/40 | (2018.01) |
| C08J 7/04 | (2020.01) |
| C08J 7/044 | (2020.01) |
| C08J 7/054 | (2020.01) |
| D06M 13/148 | (2006.01) |
| D06M 13/165 | (2006.01) |
| D06M 13/224 | (2006.01) |
| C09D 5/00 | (2006.01) |
| D06M 13/17 | (2006.01) |
| D06M 23/10 | (2006.01) |
| C08K 5/103 | (2006.01) |
| C09D 7/47 | (2018.01) |
| C08F 220/18 | (2006.01) |
| C09D 133/10 | (2006.01) |
| D06M 15/263 | (2006.01) |
| C08F 2/44 | (2006.01) |
| C08F 2/22 | (2006.01) |
| C08K 5/1535 | (2006.01) |

(Continued)

(52) U.S. Cl.
CPC ............. *C09D 7/63* (2018.01); *C08F 220/24* (2013.01); *C08J 7/044* (2020.01); *C08J 7/0427* (2020.01); *C08J 7/054* (2020.01); *C09D 5/00* (2013.01); *C09D 5/1681* (2013.01); *C09D 7/40* (2018.01); *C09D 133/10* (2013.01); *D06M 13/148* (2013.01); *D06M 13/165* (2013.01); *D06M 13/17* (2013.01); *D06M 13/224* (2013.01); *D06M 15/263* (2013.01); *D06M 23/10* (2013.01); *C08F 2/22* (2013.01); *C08F 2/44* (2013.01); *C08F 220/1808* (2020.02); *C08J 2367/00* (2013.01); *C08J 2377/00* (2013.01); *C08K 5/103* (2013.01); *C08K 5/11* (2013.01); *C08K 5/1535* (2013.01); *C09D 7/47* (2018.01); *D06M 2101/32* (2013.01); *D06M 2101/34* (2013.01); *D06M 2200/01* (2013.01); *D06M 2200/11* (2013.01); *D06M 2200/12* (2013.01)

(58) Field of Classification Search
CPC combination set(s) only.
See application file for complete search history.

(56) References Cited

U.S. PATENT DOCUMENTS

| | | |
|---|---|---|
| 2,466,672 A | 4/1949 | Habib |
| 2,640,038 A | 5/1953 | Wilder et al. |

(Continued)

FOREIGN PATENT DOCUMENTS

| | | |
|---|---|---|
| CN | 101535363 A | 9/2009 |
| CN | 102060956 A | 5/2011 |

(Continued)

OTHER PUBLICATIONS

Tadros et al. (2014). Introduction to Surfactants—2.4.4 Sorbitan Esters and Their Ethoxylated Derivatives (Spans and Tweens). De Gruyter. Retrieved from https://app.knovel.com/hotlink/pdf/id:kt010RGBT6/introduction-surfactants/sorbitan-esters-their. (Year: 2014).*

(Continued)

*Primary Examiner* — Nicole M. Buie-Hatcher

(57) ABSTRACT

The present invention relates to a coated article comprising a partial or complete fluorinated coating on the surface of an article, wherein the coating comprises 5 to 99% by weight of a hydrophobic compound, and 1 to 95% by weight of a fluorinated surface effect agent, both based on the total solids weight of the coating, where the hydrophobic compound is selected from a hydrophobic cyclic or acyclic ester alcohol.

18 Claims, No Drawings

(51) Int. Cl.
*C08K 5/11* (2006.01)
*D06M 101/32* (2006.01)
*D06M 101/34* (2006.01)

(56) References Cited

U.S. PATENT DOCUMENTS

| | | | |
|---|---|---|---|
| 2,737,458 A | 3/1956 | Burnham | |
| 3,415,661 A | 12/1968 | Sincock | |
| 3,427,265 A | 2/1969 | Brinker | |
| 3,455,726 A | 7/1969 | Mitchell et al. | |
| 3,736,287 A | 5/1973 | Patella | |
| 3,960,797 A | 6/1976 | Inman | |
| 4,467,068 A | 8/1984 | Maruyama | |
| 4,565,647 A | 1/1986 | Llenado | |
| 4,595,518 A | 6/1986 | Raynolds et al. | |
| 5,221,557 A | 6/1993 | Hunter et al. | |
| 5,593,483 A | 1/1997 | Brunken | |
| 5,753,373 A | 5/1998 | Scholz | |
| 5,925,607 A | 7/1999 | Flanagan | |
| 5,925,698 A | 7/1999 | Steckel | |
| 5,932,328 A | 8/1999 | Burke et al. | |
| 6,153,675 A | 11/2000 | Yamamoto et al. | |
| 6,274,060 B1 | 8/2001 | Sakashita et al. | |
| 6,309,984 B1 | 10/2001 | Nonaka et al. | |
| 6,319,982 B1 | 11/2001 | Huang | |
| 6,491,746 B2 | 12/2002 | Summerfield | |
| 6,524,978 B1 | 2/2003 | Moore | |
| 6,656,998 B1 | 12/2003 | Robeson | |
| 6,790,905 B2 * | 9/2004 | Fitzgerald | C08G 18/2885 427/372.2 |
| 6,939,580 B2 * | 9/2005 | Enomoto | C03C 25/26 427/354 |
| 7,202,200 B1 * | 4/2007 | DeLeo | C11D 1/62 510/191 |
| 7,592,064 B2 * | 9/2009 | Fitzgerald | C08G 18/2885 427/372.2 |
| 7,731,881 B2 | 6/2010 | Dean | |
| 7,820,745 B2 | 10/2010 | Kashiwagi | |
| 8,026,188 B2 | 9/2011 | Mor | |
| 8,716,392 B2 | 5/2014 | Bartley et al. | |
| 9,029,452 B2 | 5/2015 | Brown et al. | |
| 9,056,987 B2 | 6/2015 | Sunder et al. | |
| 9,845,410 B2 | 12/2017 | Sworen et al. | |
| 9,938,431 B2 | 4/2018 | Sworen et al. | |
| 2004/0082699 A1 | 4/2004 | Brown | |
| 2004/0219120 A1 * | 11/2004 | Mougin | A61K 8/8152 424/70.11 |
| 2005/0022309 A1 | 2/2005 | Thioliere | |
| 2005/0207824 A1 | 9/2005 | Ichikawa | |
| 2005/0211945 A1 * | 9/2005 | Coppens | D06M 13/207 252/8.57 |
| 2005/0227893 A1 | 10/2005 | Johnson | |
| 2005/0233135 A1 | 10/2005 | Iyer | |
| 2006/0186368 A1 | 8/2006 | Liu et al. | |
| 2007/0049683 A1 | 3/2007 | Kim et al. | |
| 2007/0088141 A1 | 4/2007 | Kashiwagi | |
| 2007/0237943 A1 * | 10/2007 | Wakizaka | B82Y 30/00 428/328 |
| 2007/0238812 A1 * | 10/2007 | Kashiwagi | C09K 3/18 524/1 |
| 2007/0293654 A1 * | 12/2007 | Kashiwagi | C09D 133/16 528/397 |
| 2007/0295245 A1 * | 12/2007 | Yamamoto | C08F 220/24 106/287.25 |
| 2008/0090480 A1 | 4/2008 | Akimoto et al. | |
| 2008/0148491 A1 | 6/2008 | Van Buskirk | |
| 2010/0035493 A1 | 2/2010 | Oki | |
| 2010/0173079 A1 | 7/2010 | Akiyama et al. | |
| 2010/0209361 A1 * | 8/2010 | Meier | A61Q 19/10 424/49 |
| 2010/0255215 A1 | 10/2010 | Han et al. | |
| 2011/0046283 A1 | 2/2011 | Grass | |
| 2011/0111659 A1 * | 5/2011 | Brown | C09D 133/066 442/92 |
| 2012/0071382 A1 | 3/2012 | Wang | |
| 2012/0129982 A1 * | 5/2012 | Zipplies | C08L 27/20 524/58 |
| 2013/0131226 A1 | 5/2013 | Goredema et al. | |
| 2013/0184387 A1 | 7/2013 | Tahara et al. | |
| 2014/0295724 A1 | 10/2014 | Sworen et al. | |
| 2014/0296123 A1 | 10/2014 | Sworen et al. | |
| 2015/0004351 A1 | 1/2015 | Iverson et al. | |
| 2015/0064476 A1 | 3/2015 | Kanda | |
| 2015/0267074 A1 | 9/2015 | Heine | |
| 2016/0090508 A1 | 3/2016 | Sworen et al. | |
| 2016/0090560 A1 | 3/2016 | Sworen et al. | |
| 2016/0090686 A1 | 3/2016 | Sworen et al. | |

FOREIGN PATENT DOCUMENTS

| | | |
|---|---|---|
| CN | 102490229 | 6/2012 |
| CN | 104194724 | 12/2014 |
| CN | 104389180 A | 3/2015 |
| CN | 104726022 | 6/2015 |
| CN | 104726022 A * | 6/2015 |
| CN | 103750583 B | 9/2015 |
| EP | 0738800 A2 | 10/1996 |
| EP | 1609379 A1 | 12/2005 |
| EP | 1754761 A1 | 2/2007 |
| EP | 1788047 | 5/2007 |
| JP | H05-271359 A | 3/1992 |
| JP | H04-218650 A | 8/1992 |
| JP | H05-302065 | 11/1993 |
| JP | 2004-531598 | 1/1995 |
| JP | H07-011467 A | 1/1995 |
| JP | H07-145560 A | 6/1995 |
| JP | H09-324173 A | 12/1997 |
| JP | H10-036664 A | 2/1998 |
| JP | H10-273879 | 10/1998 |
| JP | 2003-193367 A | 7/2003 |
| JP | 2004-506054 A | 2/2004 |
| JP | 2007-84668 A | 9/2005 |
| JP | 2012-036351 A | 2/2012 |
| JP | 2013-144772 A | 7/2013 |
| JP | 2013-189558 A | 9/2013 |
| JP | 2014-042798 A | 3/2014 |
| JP | 2012-224956 A | 11/2015 |
| WO | 95/18195 | 7/1995 |
| WO | 2002/064696 A1 | 8/2002 |
| WO | 2012/063756 A1 | 5/2012 |
| WO | 2012/170832 A | 12/2012 |
| WO | 2013061061 A1 | 5/2013 |
| WO | 2014160906 A | 10/2014 |
| WO | 20140160905 A | 10/2014 |
| WO | 2016049293 A | 3/2016 |

OTHER PUBLICATIONS

Fused quartz. (1992). In C. G. Morris (Ed.), Academic Press Dictionary of Science and Technology (4th ed.). Elsevier Science & Technology. Credo Reference: https://search.credoreference.com/content/entry/apdst/fused_quartz/0?institutionId=743 (Year: 1992).*
Pepper, Relationship of the Chemical Constitution of Ethoxylated Fatty Acid Esters of Sorbitol and Their Antistatic Properties When Applied to Polypropylene Carpeting, Thesis, Georgia Institute of Technology, Oct. 1969.
International Search Report and Written Opinion for PCT/US2016/054600 dated Dec. 8, 2016.
"Thermal Transitions of Homopolymers: Glass Transition & Melting Point", https://www.sigmaaldrich.com/technical-documents/articles/materials-science/polymer-science/thermal-transitions-of-homopolymers.printerview.html (accessed Dec. 2019).
Ash et al. (2009). Industrial Chemical Thesaurus (5th Edition)—Polyquaternium-11 to Polystyrene, expandable, pp. 2283-2284. Synapse Information Resources, Inc. Retrieved from https://app.knovel.com/hotlink/pdf/id:kt008H9C81/industrial-chemical-thesaurus/polyquaternium-11-polystyrene. (Year: 2009).
"Chemical Products: STA", Osaka Organic Chemical Industry Ltd., available at https://www.ooc.co.jp/en/products/chemical/monofunctional/STA, 2 pages, 2017.

(56) References Cited

OTHER PUBLICATIONS

"Chemical Products: LA", Osaka Organic Chemical Industry Ltd., available at https://www.ooc.co.jp/en/products/chemical/monofunctional/LA, 2 pages, 2017.
"BLEMMER Series General Catalog", NOF Corporation, 55 pages, 2020.

\* cited by examiner

HYDROPHOBIC EXTENDERS IN FLUORINATED SURFACE EFFECT COATINGS

FIELD OF THE INVENTION

Hydrophobic substituted ester alcohols are employed as extenders for surface effect agents in coatings to provide enhanced surface effects to various articles.

BACKGROUND OF THE INVENTION

Various compositions are known to be useful as treating agents to provide surface effects to substrates. Surface effects include repellency to moisture, soil and stain resistance, and other effects which are particularly useful for fibrous substrates such as fibers, fabrics, textiles, carpets, paper, leather and other such substrates. Many such treating agents are partially fluorinated polymers or copolymers.

Fluorinated polymer compositions having utility as fibrous substrate treating agents generally contain pendant perfluoroalkyl groups of three or more carbon atoms, which provide oil- and water-repellency when the compositions are applied to fibrous substrate surfaces. The perfluoroalkyl groups are generally attached by various connecting groups to polymerizable groups not containing fluorine. The resulting monomer is then generally copolymerized with other monomers which confer additional favorable properties to the substrates. Various specialized monomers may be incorporated to impart improved cross-linking, latex stability and substantivity. Since each ingredient may impart some potentially undesirable properties in addition to its desirable ones, the specific combination is directed to the desired use. These polymers are generally marketed as aqueous emulsions for easy application to the fibrous substrates.

Various attempts have been made to increase the oil- and water-repellency imparted to the substrate and its durability while reducing the amount of fluorinated polymer required, i.e., boost the efficiency or performance of the treating agent. One method is to incorporate blocked isocyanates or melamine resins. However, only limited amounts can be used because these ingredients tend to adversely affect the handle (the feel) of the fibrous substrate. Another approach employs use of various extender polymers. These are typically hydrocarbon polymers in aqueous emulsions, which are blended with the fluorinated polymer emulsion before application to the substrate.

U.S. Pat. No. 7,820,745 discloses aqueous water- and oil-repellent compositions containing a fluorinated copolymer in aqueous medium and a sorbitan ester used in small amounts to act as a surfactant.

BRIEF SUMMARY OF THE INVENTION

There is a need for surface effect compositions which provide hydrophobicity performance with improved fluorine efficiency. The present invention provides such a composition.

The present invention relates to a coated article comprising a partial or complete fluorinated coating on the surface of an article, wherein the coating comprises 5 to 99% by weight of a hydrophobic compound, and 1 to 95% by weight of at least one fluorinated surface effect agent, both based on the total solids weight of the coating, selected from a cyclic or acyclic alcohol which is substituted with at least two $-R^1$, $-C(O)R^1$, $-(CH_2CH_2O)_n(CH(CH_3)CH_2O)_mR^2$, $-(CH_2CH_2O)_n(CH(CH_3)CH_2O)_mC(O)R^1$, or mixtures thereof; where the cyclic or acyclic sugar alcohol is selected from a pentaerythritol, saccharide, reduced sugar, aminosaccharide, citric acid, aldonic acid, or aldonic acid lactone; wherein each n is independently 0 to 20; each m is independently 0 to 20; m+n is greater than 0; each $R^1$ is independently a linear or branched alkyl group having 5 to 29 carbons; each $R^2$ is independently —H, a linear or branched alkyl group having 6 to 30 carbons; and wherein, if the fluorinated surface effect agent is a fluorinated acrylic copolymer, it is a reaction product of monomers comprising: a) one or more fluorinated ethylenically unsaturated monomers; b) an ethylenically unsaturated monomer having a polar or reactive group; and c) one or more monomers selected from a second ethylenically unsaturated monomer having a polar or reactive group, or a non-fluorinated ethylenically unsaturated hydrophobic monomers wherein the homopolymer of hydrophobic monomer c) has a maximum glass transition temperature ($T_g$) of 45° C. and/or a maximum melt transition temperature ($T_m$) of 25° C.

The present invention further relates to a method of imparting a surface effect to an article comprising contacting a the surface of the article with a fluorinated coating to form a partially or completely coated article, wherein the coating comprises 5 to 99% by weight of a hydrophobic compound, and 1 to 95% by weight of at least one fluorinated surface effect agent, both based on the total solids weight of the coating, selected from a cyclic or acyclic alcohol which is substituted with at least two $-R^1$, $-C(O)R^1$, $-(CH_2CH_2O)_n(CH(CH_3)CH_2O)_mR^2$, $-(CH_2CH_2O)_n(CH(CH_3)CH_2O)_mC(O)R^1$, or mixtures thereof; where the cyclic or acyclic sugar alcohol is selected from a pentaerythritol, saccharide, reduced sugar, aminosaccharide, citric acid, aldonic acid, or aldonic acid lactone; wherein each n is independently 0 to 20; each m is independently 0 to 20; m+n is greater than 0; each $R^1$ is independently a linear or branched alkyl group having 5 to 29 carbons; each $R^2$ is independently —H, a linear or branched alkyl group having 6 to 30 carbons; and wherein, if the fluorinated surface effect agent is a fluorinated acrylic copolymer, it is a reaction product of monomers comprising: a) one or more fluorinated ethylenically unsaturated monomers; b) an ethylenically unsaturated monomer having a polar or reactive group; and c) one or more monomers selected from a second ethylenically unsaturated monomer having a polar or reactive group, or a non-fluorinated ethylenically unsaturated hydrophobic monomers wherein the homopolymer of hydrophobic monomer c) has a maximum glass transition temperature ($T_g$) of 45° C. and/or a maximum melt transition temperature ($T_m$) of 25° C.

DETAILED DESCRIPTION OF THE INVENTION

Trademarks are indicated herein by capitalization.

The present invention relates to a coated article comprising a partial or complete fluorinated coating on the surface of an article, wherein the coating comprises 5 to 99% by weight of a hydrophobic compound, and 1 to 95% by weight of at least one fluorinated surface effect agent, both based on the total solids weight of the coating, selected from a cyclic or acyclic alcohol which is substituted with at least two $-R^1$, $-C(O)R^1$, $-(CH_2CH_2O)_n(CH(CH_3)CH_2O)_mR^2$, $-(CH_2CH_2O)_n(CH(CH_3)CH_2O)_mC(O)R^1$, or mixtures thereof; where the cyclic or acyclic sugar alcohol is selected from a pentaerythritol, saccharide, reduced sugar, aminosaccharide, citric acid, aldonic acid, or aldonic acid lactone; wherein each n is independently 0 to 20; each m is independently 0 to 20; m+n is greater than 0; each $R^1$ is independently a linear or branched alkyl group having 5 to 29 carbons; each $R^2$ is independently —H, a linear or branched alkyl group having 6 to 30 carbons; and wherein, if the fluorinated surface effect agent is a fluorinated acrylic copolymer, it is a reaction product of monomers comprising: a) one or more fluorinated ethylenically unsaturated monomers; b) an ethylenically unsaturated monomer having a polar or reactive group; and c) one or more monomers selected from a second ethylenically unsaturated monomer having a polar or reactive group, or a non-fluorinated ethylenically unsaturated hydrophobic monomers wherein the homopolymer of hydrophobic monomer c) has a maximum glass transition temperature $(T_g)$ of 45° C. and/or a maximum melt transition temperature $(T_m)$ of 25° C. The —($CH_2CH_2O$)— represents oxyethylene groups (EO) and —($CH(CH_3)CH_2O$)— represents oxypropylene groups (PO). These compounds can contain only EO groups, only PO groups, or mixtures thereof. These compounds can also be present as a tri-block copolymer designated PEG-PPG-PEG (polyethylene glycol-polypropylene glycol-polyethylene glycol), for example. In one embodiment, n+m is 1 to 20; in another embodiment, n+m is 1 to 15; and in a third embodiment, n+m is 1 to 12.

The hydrophobic compound may be a polyester alcohol having at least two hydrophobic substitutions, which originates from a polyol or polycarboxylic acid compound. Examples of suitable polyols include but are not limited to cyclic or acyclic sugar alcohols, or pentaerythritols including dipentaerythritol. Suitable polycarboxylic acid compounds include citric acid. The cyclic or acyclic sugar alcohol is selected from a saccharide, reduced sugar, aminosaccharide, aldonic acid, or aldonic acid lactone. Mixtures of these compounds may also be used. The hydrophobic compounds are substituted with at least two —$R^1$; —C(O)$R^1$; —($CH_2CH_2O$)$_n$($CH(CH_3)CH_2O$)$_m R^2$; —($CH_2CH_2O$)$_n$($CH(CH_3)CH_2O$)$_m$C(O)$R^1$; or mixtures thereof. Such a substitution lends hydrophobic character to the monomer, and to the polymer molecules. In one embodiment, the hydrophobic compound is substituted with at least three —$R^1$; —C(O)$R^1$; —($CH_2CH_2O$)$_n$($CH(CH_3)CH_2O$)$_m R^2$; —($CH_2CH_2O$)$_n$($CH(CH_3)CH_2O$)$_m$C(O)$R^1$; or mixtures thereof.

These substituted compounds can be made by the reaction of a sugar alcohol with at least one fatty acid or alkoxylated fatty acid, such as by esterification of a fatty acid; or by esterification of a polycarboxylic acid with a long-chain alcohol. Examples of such sugar alcohols include but are not limited to aldoses and ketoses such as those compounds derived from tetroses, pentoses, hexoses, and heptoses. Specific examples include glucose, 1,4-anhydro-D-glucitol, 2,5-anhydro-D-mannitol, 2,5-anhydro-L-iditol, sorbitan, glyceraldehyde, erythrose, arabinose, ribose, arabinose, allose, altrose, mannose, xylose, lyxose, gulose, glactose, talose, fructose, ribulose, mannoheptulose, sedohelptulose, threose, erythritol, threitol, glucopyranose, mannopyranose, talopyranose, allopyranose, altropyranose, idopyranose, gulopyranose, glucitol, mannitol, erythritol, sorbitol, arabitol, xylitol, ribitol, galactitol, fucitol, iditol, inositol, pentaerythritol, dipentaerythritol, volemitol, gluconic acid, glyceric acid, xylonic acid, galactaric acid, ascorbic acid, citric acid, gluconic acid lactone, glyceric acid lactone, xylonic acid lactone, glucosamine, galactosamine, or mixtures thereof.

Suitable fatty acids include, but are not limited to, caprylic acid, capric acid, lauric acid, mysteric acid, palmitic acid, stearic acid, behenic acid, lignoceric acid, alkoxylated versions of these acids, and mixtures thereof. In one embodiment, $R^1$ is a linear or branched alkyl group having 11 to 29 carbons, and in another embodiment, $R^1$ is a linear or branched alkyl group having 17 to 21 carbons. In one embodiment, $R^2$ is a linear or branched alkyl group having 12 to 30 carbons, in another embodiment, $R^2$ is a linear or branched alkyl group having 18 to 30 carbons, and in another embodiment, $R^2$ is a linear or branched alkyl group having 18 to 22 carbons. In one embodiment, the fatty acid substitution of the cyclic or acyclic alcohols has a melting point of at least −59° C. In another embodiment, the fatty acid substitution of the cyclic or acyclic alcohols has a melting point of at least 0° C., and in a third embodiment, the fatty acid In one embodiment, the hydrophobic compound is selected from formulas (Ia), (Ib), or (Ic):

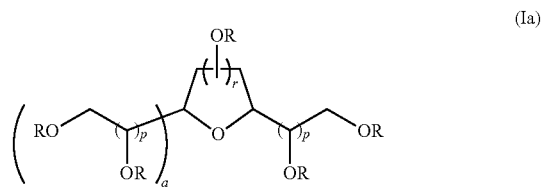

(Ia)

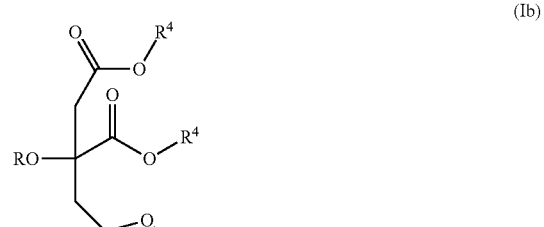

(Ib)

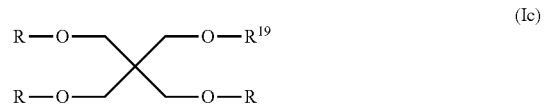

(Ic)

wherein each R is independently —H; —$R^1$, —C(O)$R^1$, —($CH_2CH_2O$)$_n$($CH(CH_3)CH_2O$)$_m R^2$, —($CH_2CH_2O$)$_n$($CH(CH_3)CH_2O$)$_m$C(O)$R^1$; each n is independently 0 to 20; each m is independently 0 to 20; m+n is greater than 0; r is 1 to 3; a is 0 or 1; p is independently 0 to 2; provided that a is 0 when r is 3; each $R^1$ is independently a linear or branched alkyl group having 5 to 29 carbons; each $R^2$ is independently H, or a linear or branched alkyl group having 6 to 30 carbons; provided when formula (Ia) is chosen, then at least one R is —H and at least two R groups are a —$R^1$; —C(O)$R^1$; —($CH_2CH_2O$)n($CH(CH_3)CH_2O$)m$R^2$; or —($CH_2CH_2O$)n($CH(CH_3)CH_2O$)mC(O)$R^1$; each $R^4$ is independently —H, a linear or branched alkyl group having 6 to 30 carbons, or combinations thereof; —($CH_2CH_2O$)n($CH(CH_3)CH_2O$)m$R^2$;
or —($CH_2CH_2O$)n($CH(CH_3)CH_2O$)mC(O)$R^1$; provided when formula (Ib) is chosen, then at least one R or $R^4$ is —H; and at least two of R or $R^4$ are a linear or branched alkyl group, or combinations thereof; —($CH_2CH_2O$)n($CH(CH_3)CH_2O$)m$R^2$; or —($CH_2CH_2O$)n($CH(CH_3)CH_2O$)mC(O)$R^1$; and each $R^{19}$ is —H, —C(O)$R^1$, or —$CH_2$C[$CH_2OR$]$_3$, provided when formula (Ic) is chosen, then at least one $R^{19}$ or R is —H; and at least two of $R^{19}$ or R are —(O)$R^1$, —($CH_2CH_2O$)n($CH(CH_3)CH_2O$)m$R^2$; or —($CH_2CH_2O$)n($CH(CH_3)CH_2O$)mC(O)$R^1$. In one aspect, R, $R^1$, $R^4$, and $R^{19}$ are saturated linear or branched alkyl groups.

Where the hydrophobic compound is formula (Ia), any suitable substituted reduced sugar alcohol may be employed, including esters of 1,4-sorbitan, esters of 2,5-sorbitan, and esters of 3,6-sorbitan. In one embodiment, the hydrophobic compound is selected from formula (Ia) to be formula (Ia'):

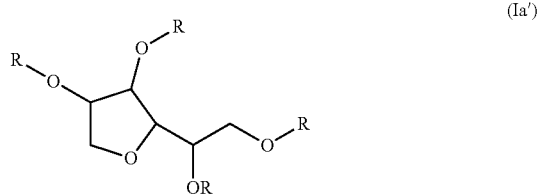

wherein R is further limited to —H; —R$^1$; or —C(O)R$^1$ and at least two R groups are —C(O)R$^1$ or R$^1$. Compounds used to form residues of formula (Ia'), having at least one of R is —H and at least two R groups are selected from —C(O)R$^1$, are commonly known as alkyl sorbitans. These sorbitans can be di-substituted, or tri-substituted with —C(O)R$^1$. It is known that commercially available sorbitans, such as SPAN, contain a mixture of the various sorbitans ranging from where each R is H (un-substituted), and sorbitans where each R is —C(O)R$^1$ (fully substituted); wherein R$^1$ is a linear or branched alkyl group having 5 to 29 carbons; and mixtures of various substitutions thereof. The commercially available sorbitans may also include amounts of sorbitol, isosorbide, or other intermediates or byproducts.

In one embodiment, at least two R groups are —C(O)R$^1$, and R$^1$ is a linear branched alkyl group having 5 to 29 carbons. In another embodiment, R$^1$ is a linear or branched alkyl group having 7 to 21 carbons, and in a third embodiment, R$^1$ is a linear or branched alkyl group having 11 to 21 carbons. Preferred compounds used to form these residues include di- and tri-substituted sorbitans derived from caprylic acid, capric acid, lauric acid, mysteric acid, palmitic acid, stearic acid, arachidic acid, behenic acid, lignoceric acid, and mixtures thereof. Particularly preferred compounds include di- and tri-substituted sorbitan stearates or sorbitan behenins.

In one embodiment, a compound of formula (Ia) is employed, wherein at least two R groups are independently —(CH$_2$CH$_2$O)n(CH(CH$_3$)CH$_2$O)mR$^2$ or —(CH$_2$CH$_2$O)n(CH(CH$_3$)CH$_2$O)mC(O)R$^1$. Compounds of formula (Ia), wherein at least two R groups are —(CH$_2$CH$_2$O)n(CH(CH$_3$)CH$_2$O)mR$^2$ or —(CH$_2$CH$_2$O)n(CH(CH$_3$)CH$_2$O)mC(O)R$^1$, wherein each m is independently 0 to 20, each n is independently 0 to 20, and n+m is greater than 0 are known as polysorbates and are commercially available under the tradename TWEEN. These polysorbates can be di-substituted or tri-substituted with alkyl groups R$^1$ or R$^2$. It is known that commercially available polysorbates contain a mixture of the various polysorbates ranging from where each R$^2$ is H (unsubsituted), and polysorbates where each R$^1$ is a linear or branched alkyl group having 5 to 29 carbons (fully substituted); and mixtures of various substitutions thereof. Examples of compounds of formula (Ia) include polysorbates such as polysorbate tristearate and polysorbate monostearate. Examples of compounds of Formula (Ia) wherein m+n is greater than 0, and wherein R$^1$ comprises at least 1 unsaturated bond, but not limited to, polysorbate trioleate (wherein R$^1$ is C$_7$H$_{14}$CH=CHC$_8$H$_{17}$) and are sold commercially under the name Polysorbate 80. Reagents may include mixtures of compounds having various values for R, R$^1$, and R$^2$, and may also include mixtures of compounds where R$^1$ comprises at least one unsaturated bond with compounds where R$^1$ is fully saturated.

Compounds of formula (Ib) are known as alkyl citrates. These citrates can be present as a di-substituted or tri-substituted with alkyl groups. It is known that commercially available citrates contain a mixture of the various citrates as well as citric acids from where R and each R$^4$ is —H, ranging to citrates where each R$^4$ is a linear or branched alkyl group having 6 to 30 carbons optionally comprising at least 1 unsaturated bond; and mixtures of various substitutions thereof. Mixtures of citrates having various values for R$^1$, R$^2$, and R$^4$ may be used, and may also include mixtures of compounds where R$^1$ comprises at least one unsaturated bond with compounds where R$^1$ is fully saturated. Alkyl citrates are also commercially available wherein m+n is greater than 0, R$^4$ is —(CH$_2$CH$_2$O)n(CH(CH$_3$)CH$_2$O)mR$^2$; or —(CH$_2$CH$_2$O)n(CH(CH$_3$)CH$_2$O)mC(O)R$^1$ and are present in the various substitutions from wherein R and each R$^2$ is H to wherein each R$^1$ and/or R$^2$ is a linear or branched alkyl group having 5 to 30 carbons. Examples of compounds of formula (Ib) include, but are not limited to, trialkyl citrates.

Compounds of formula (Ic) are known as pentaerythriol esters. These pentaerythriol esters can be present as a di-substituted or tri-substituted with alkyl groups. Preferred compounds used to form X of formula (Ic) are dipentaerythriol esters, where R$^{19}$ is —CH$_2$C[CH$_2$OR]$_3$. It is known that commercially available pentaerythriol esters contain a mixture of the various pentaerythriol esters where R$^{19}$ and each R is —H, ranging to pentaerythriol esters where each R is —C(O)R$^1$, and R$^1$ is a linear or branched alkyl group having 5 to 29 carbons; and mixtures of various substitutions thereof. The pentaerythriol esters also may contain compounds with mixtures of different chain lengths for R, or mixtures of compounds where R$^1$ comprises at least one unsaturated bond with compounds where R$^1$ is fully saturated.

Compounds of formulas (Ia), (Ib), and (Ic) can all be bio-based derived. By "bio-based derived", it is meant that at least 10% of the material can be produced from non-crude oil sources, such as plants, other vegetation, and tallow. In one embodiment, the hydrophobic compound is from about 10% to 100% bio-based derived. In one embodiment, hydrophobic compound is from about 35% to 100% bio-based derived. In another embodiment, hydrophobic compound is from about 50% to 100% bio-based derived. In one embodiment, hydrophobic compound is from about 75% to 100% bio-based derived. In one embodiment, hydrophobic compound is 100% bio-based derived. The average OH value of the hydrophobic compounds can range from just greater than 0 to about 230. In one embodiment, the average OH value is from about 10 to about 175, and in another embodiment, the average OH value is from about 25 to about 140.

In one aspect, the coating on the article surface comprises 5 to 99% by weight of a hydrophobic compound, and 1 to 95% by weight of a surface effect agent, both based on the total solids weight of the coating. In another aspect, the coating on the article surface comprises 10 to 90% by weight of a hydrophobic compound, and 10 to 90% by weight of a surface effect agent, both based on the total solids weight of the coating; and in a third aspect, 20 to 80% by weight of a hydrophobic compound, and 20 to 80% by weight of a surface effect agent, both based on the total solids weight of the coating. The term "solids weight of the coating", is used to mean the sum of the coating components that would remain once the aqueous, solvent, or other liquid components evaporated. In other words, it is the sum of the non-aqueous, non-solvent, and non-volatile components of the coating. The coating may further comprise aqueous or organic solvents, polymer resins, pigments, functional additives, and surfactants.

Surface effect agents provide surface effects such as no iron, easy to iron, shrinkage control, wrinkle free, permanent press, moisture control, softness, strength, anti-slip, anti-static, anti-snag, anti-pill, stain repellency, stain release, soil repellency, soil release, water repellency, oil repellency, odor control, antimicrobial, sun protection, and similar effects. Such materials can be in the form of hydrophobic partially fluorinated urethanes, cationic partially fluorinated acrylic polymers or copolymers, nonionic partially fluorinated acrylic polymers or copolymers, partially fluorinated acrylamide polymers or copolymers, fluorinated phosphates, fluorinated ethoxylates, fluorinated or non-fluorinated organosilanes, silicones, waxes, including parafins, and mixtures thereof. Some stain release and soil release agents are hydrophilic and include compounds such as polymethyl acrylates or hydrophilic urethanes. These compounds may also be used as surface effect agents and combined with the hydrophobic compounds, from about 1:99 or 5:95 to 95:5 in one aspect; from about 10:90 to 90:10 in a second aspect; and from about 20:80 to 80:20 in a third aspect, based on the total solids weight of the coating. In another embodiment, the compounds are used as surface effect agents and combined with the hydrophobic compounds, from about 21:79 to 79:21 in one aspect; from about 25:75 to 75:25 in a second aspect; and from about 30:70 to 70:30 in a third aspect, based on the total solids weight of the coating.

Superior properties, along with desirable properties of low yellowing and good durability, are imparted to articles by the combination of the hydrophobic compounds to hydrophobic surface effect agents before application to the articles. These combined blends are applied to the articles in the form of a dispersion in water or other solvent either before, after or during the application of other treatment chemicals.

Of particular interest are fluorinated polymers useful as hydrophobic surface effect agents to provide repellency properties to the surface of treated substrates. These include fluorochemical compounds or polymers containing one or more fluoroaliphatic groups (designated here as $R_f$ groups) which are fluorinated, stable, inert, and non-polar, preferably saturated, monovalent, and both oleophobic and hydrophobic. The $R_f$ groups contain at least 3 carbon atoms, preferably 3 to 20 carbon atoms, more preferably 4 to 12 carbon atoms, and most preferably about 4 to about 6 carbon atoms. The $R_f$ groups may contain straight or branched chain or cyclic fluorinated alkylene groups or combinations thereof. The terminal portion of the $R_f$ groups is preferably a perfluorinated aliphatic group of the formula $C_nF_{2n+1}$ wherein n is from about 3 to about 20. Examples of fluorinated polymer treating agents are CAPSTONE and ZONYL available from The Chemours Company, Wilmington, Del.; ASAHI GARD from Asahi Glass Company, Ltd., Tokyo, Japan; UNIDYNE from Daikin America, Inc., Orangeburg, N.Y.; SCOTCHGARD from 3M Company, St. Paul, Minn.; and NANO TEX from Nanotex, Emeryville, Calif.

Examples of such fluorinated polymers include $R_f$-containing polyurethanes and poly(meth)acrylates. Fluorinated urethanes include, for example, reaction products of $R_f$-containing monoalcohol with a polyisocyanate and water, optionally containing a second isocyanate-reactive compound. In one aspect, the fluorinated poly(meth)acrylates are are copolymers of fluorochemical (meth)acrylate monomers with a co-polymerizable monovinyl compound or a conjugated diene. The co-polymerizable monovinyl compounds include alkyl (meth)acrylates, vinyl esters of aliphatic acids, styrene and alkyl styrene, vinyl halides, vinylidene halides, alkyl esters, vinyl alkyl ketones, and acrylamides. The conjugated dienes are preferably 1,3-butadienes. Representative compounds within the preceding classes include the methyl, propyl, butyl, 2-hydroxypropyl, 2-hydroxyethyl, isoamyl, 2-ethylhexyl, octyl, decyl, lauryl, cetyl, and octadecyl acrylates and methacrylates; vinyl acetate, vinyl propionate, vinyl caprylate, vinyl laurate, vinyl stearate, styrene, alpha methyl styrene, p-methylstyene, vinyl fluoride, vinyl chloride, vinyl bromide, vinylidene fluoride, vinylidene chloride, allyl heptanoate, allyl acetate, allyl caprylate, allyl caproate, vinyl methyl ketone, vinyl ethyl ketone, 1,3-butadiene, 2-chloro-1,3-butadiene, 2,3-dichloro-1,3-butadiene, isoprene, N-methylolacrylamide, N-methylolmethacrylamide, glycidyl acrylate, glycidyl methacrylate, amine-terminated (meth)acrylates, and polyoxy(meth)acrylates.

Where the fluorinated surface effect agent is a partially fluorinated acrylic polymer, it is a reaction product of monomers comprising: a) one or more fluorinated ethylenically unsaturated monomers; b) an ethylenically unsaturated monomer having a polar or reactive group; and c) one or more monomers selected from a second ethylenically unsaturated monomer having a polar or reactive group, or a non-fluorinated ethylenically unsaturated hydrophobic monomers wherein the homopolymer of hydrophobic monomer c) has a maximum glass transition temperature ($T_g$) of 45° C. and/or a maximum melt transition temperature ($T_m$) of 25° C.

In one aspect, suitable fluorinated acrylic polymers are the reaction product of 40-99.8% by weight of monomer a), 0.1-30% by weight of monomer b), and 0.1-30% by weight of monomer c), where the total monomer units equal 100%. In another aspect, the fluorinated acrylic polymers are the reaction product of 45-98.9% by weight of monomer a), 0.1-25% by weight of monomer b), and 1-30% by weight of monomer c), where the total monomer units equal 100%. In another aspect, monomer c) contains both a second ethylenically unsaturated monomer having a polar or reactive group, and a non-fluorinated ethylenically unsaturated hydrophobic monomers wherein the homopolymer of hydrophobic monomer c) has a maximum glass transition temperature ($T_g$) of 45° C. and/or a maximum melt transition temperature ($T_m$) of 25° C. In a third aspect, the fluorinated acrylic polymers are the reaction product of 45-99.7% by weight of monomer a), 0.1-15% by weight of monomer b), 0.1-15% by weight of monomer a second ethylenically unsaturated monomer having a polar or reactive group c), and 0.1-15% by weight of a non-fluorinated ethylenically unsaturated hydrophobic monomers wherein the homopolymer of hydrophobic monomer c) has a maximum glass transition temperature ($T_g$) of 45° C. and/or a maximum melt transition temperature ($T_m$) of 25° C., where the total monomer units equal 100%. In a fourth aspect, additional monomers are employed beyond a), b), and c), where the total monomer units equal 100%.

Specific fluorinated ethylenically unsaturated monomers a) used to incorporate fluoroalkyl functionality include but are not limited to $R_fCH_2CH_2OC(O)CR^3=CH_2$, $R_fSO_2NHCH_2CH_2OC(O)CR^3=CH_2$, $R_fCH_2CH_2SCH_2CH_2OC(O)CR^3=CH_2$, $R_fCH_2CH_2CF_2CF_2CH_2CH_2OC(O)CR^3=CH_2$, $R_fCH_2CH_2(CF_2CF_2CH_2CH_2)_2OC(O)CR^3=CH_2$, $R_fCH_2CF_2CH_2CH_2OC(O)CR^3=CH_2$, $R_fCH_2CF_2CH_2CF_2CH_2CH_2OC(O)CR^3=CH_2$, $R_fOCF_2CF_2CH_2CH_2OC$ (O)CR$^3$=CH$_2$, R$_f$CH$_2$OCH$_2$CH$_2$OC(O)CR$^3$=CH$_2$, R$_f$CHFCH$_2$CH$_2$OH, R$_f$CH$_2$O(CH$_2$)$_6$OC(O)CR$^3$=CH$_2$, (CF$_3$)$_2$CFCH$_2$CH$_2$OC(O)CR$^3$=CH$_2$, (CF$_3$)$_2$CFCH$_2$CH$_2$CH$_2$OC(O)CR$^3$=CH$_2$, R$_f$CH$_2$CH$_2$SO$_2$ NHCH$_2$CH$_2$OC(O)CR$^3$=CH$_2$, R$_f$CH$_2$CH$_2$SO$_2$N(CH$_3$)CH$_2$CH$_2$OC(O)CR$^3$=CH$_2$, R$_f$CH$_2$CH$_2$SO$_2$N(CH$_2$CH$_3$)CH$_2$CH$_2$OC(O)CR$^3$=CH$_2$, R—(CF(CF$_3$)CF$_2$O)$_y$CH$_2$OC(O)CR$^3$=CH$_2$, CF$_2$=CFOCF$_2$CF(CF$_3$)OCF$_2$CF$_2$CH$_2$OC(O)CR$^3$=CH$_2$, or R$_f$CH$_2$OC$_2$F$_4$CH$_2$OCH$_2$CH$_2$OC(O)CR$^3$=CH$_2$, where R$_f$ is a linear or branched fluoroalkyl of C$_1$-C$_{20}$, or CH$_2$=CH—COO—C$_2$H$_4$—N(CH$_3$)—SO$_2$—C$_2$H$_4$—C$_6$F$_{13}$, 2-[methyl[(3,3,4,4,5,5,6,6,6-nonfluorohexyl)sulfonyl]amino]ethyl acrylate, 2-[methyl[(3,3,4,4,5,5,6,6,7,7,8,8,8-tridecafluorooctyl)sulfonyl]amino]ethyl methacrylate, or 2-[[(3,3,4,4,5,5,6,6,7,7,8,8,8-tridecafluorooctyl)sulfonyl]amino]ethyl methacrylate. In one embodiment, R$_f$ is a C$_2$ to C$_6$ perfluoroalkyl.

Specific non-fluorinated ethylenically unsaturated hydrophobic monomers c) include but are not limited to linear or branched alkyl (meth)acrylates or linear or branched alkyl (meth)acrylamides. In one aspect, suitable monomers include but are not limited to butyl (meth)acrylate, sec-butyl acrylate, cyclohexyl acrylate, diethylaminoethyl methacrylate, dimethylaminoethyl methacrylate, dodecyl (meth)acrylate, dodecyl vinyl ether, ethyl acrylate, 2-ethylhexyl (meth)acrylate, hexadecyl (meth)acrylate, hexyl methacrylate, isobutyl acrylate, isobutyl vinyl ether, methyl acrylate, methylstyrene, or octyl methacrylate.

Monomers useful as the ethylenically unsaturated monomers with polar or reactive groups of monomer component b) or c) include ethoxylated (meth)acrylates such as 7-EO methacrylate, 9-PO methacrylate, or 3.5-EO/2.5-PO methacrylate; hydroxyl-terminated (meth)acrylates such as N-methylol acrylamide, N-methylol methacrylate, hydroxyethyl (meth)acrylate, or hydroxypropyl (meth)acrylate; carboxylic acid monomers such as (meth)acrylic acid; or glycidyl (meth)acrylate. In one embodiment, monomer b) is an ethoxylated (meth)acrylate, and at least one monomer c) is a hydroxyl-terminated (meth)acrylate.

Additional monomers may also be included in the fluorinated acrylic polymers, provided that the total monomer unit percentage totals 100%. For example, additional hydrophobic monomers may be added, which have a T$_g$ above 45° C. and/or a T$_m$ above 25° C. Such monomers include but are not limited to long-chain alkyl (meth)acrylate monomers. In one aspect, the fluorinated acrylic polymers are reaction products of monomers a), b), c), d) a hydrophobic ethylenically unsaturated monomer having a T$_g$ of at least 45° C. and/or a T$_m$ of at least 25° C.

The coatings of the present invention applied to fibrous substrates optionally further comprise a blocked isocyanate to promote durability, added after copolymerization (i.e., as a blended isocyanate). An example of a suitable blocked isocyanate is PHOBOL XAN available from Huntsman Corp, Salt Lake City, Utah Other commercially available blocked isocyanates are also suitable for use herein. The desirability of adding a blocked isocyanate depends on the particular application for the copolymer. For most of the presently envisioned applications, it does not need to be present to achieve satisfactory cross-linking between chains or bonding to fibers. When added as a blended isocyanate, amounts up to about 20% by weight are added.

The coating composition of the present invention optionally further comprises additional components such as additional treating agents or finishes to achieve additional surface effects, or additives commonly used with such agents or finishes. Such additional components comprise compounds or compositions that provide surface effects such as no iron, easy to iron, shrinkage control, wrinkle free, permanent press, moisture control, softness, strength, anti-slip, anti-static, anti-snag, anti-pill, stain repellency, stain release, soil repellency, soil release, water repellency, oil repellency, odor control, antimicrobial, sun protection, and similar effects. One or more such treating agents or finishes can be combined with the blended composition and applied to the fibrous substrate. Other additives commonly used with such treating agents or finishes may also be present such as surfactants, pH adjusters, cross linkers, wetting agents, and other additives known by those skilled in the art. Further, other extender compositions are optionally included to obtain a combination of benefits.

For example, when synthetic fabrics are treated, a wetting agent can be used, such as ALKANOL 6112 available from The Chemours Company, Wilmington, Del. As a further example, when cotton or cotton-blended fabrics are treated, a wrinkle-resistant resin can be used such as PERMAFRESH EFC available from Emerald Carolina, LLC, Charlotte, N.C. As a further example, when nonwoven fabrics are treated, a wax extender can be employed such as FREEPEL 1225WR, available from Omnova Solutions Chester, S.C. An antistat such as ZELEC KC, available from Stepan, Northfield, Ill., or a wetting agent, such as hexanol, also are suitable. The dispersions are generally applied to fibrous substrates by spraying, dipping, padding, or other well-known methods. After excess liquid has been removed, for example by squeeze rolls, the treated fibrous substrate is dried and then cured by heating, for example, to from about 100° C. to about 190° C., for at least 30 seconds, typically from about 60 to about 240 seconds. Such curing enhances oil-, water- and soil repellency and durability of the repellency. While these curing conditions are typical, some commercial apparatus may operate outside these ranges because of its specific design features.

In one embodiment, the present invention relates to a method of imparting a surface effect to an article comprising contacting a the surface of the article with a fluorinated coating to form a partially or completely coated article, wherein the coating comprises 5 to 99% by weight of a hydrophobic compound, and 1 to 95% by weight of at least one fluorinated surface effect agent, both based on the total solids weight of the coating, selected from a cyclic or acyclic alcohol which is substituted with at least two —R$^1$, —C(O)R$^1$, —(CH$_2$CH$_2$O)$_n$(CH(CH$_3$)CH$_2$O)$_m$R$^2$, —(CH$_2$CH$_2$O)$_n$(CH(CH$_3$)CH$_2$O)$_m$C(O)R$^1$, or mixtures thereof; where the cyclic or acyclic sugar alcohol is selected from a pentaerythritol, saccharide, reduced sugar, aminosaccharide, citric acid, aldonic acid, or aldonic acid lactone; wherein each n is independently 0 to 20; each m is independently 0 to 20; m+n is greater than 0; each R$^1$ is independently a linear or branched alkyl group having 5 to 29 carbons; each R$^2$ is independently —H, a linear or branched alkyl group having 6 to 30 carbons; and wherein, if the fluorinated surface effect agent is a fluorinated acrylic copolymer, it is a reaction product of monomers comprising: a) one or more fluorinated ethylenically unsaturated monomers; b) an ethylenically unsaturated monomer having a polar or reactive group; and c) one or more monomers selected from a second ethylenically unsaturated monomer having a polar or reactive group, or a non-fluorinated ethylenically unsaturated hydrophobic monomers wherein the homopolymer of hydrophobic monomer c) has a maximum glass transition temperature (T$_g$) of 45° C. and/or a maximum melt transition temperature (T$_m$) of 25° C.

The articles may include but are not limited to a fiber, textile, fabric, fabric blend, paper, nonwoven, leather, proppant particle, inorganic oxide particle, unglazed concrete, brick, tile, granite, limestone, marble, grout, mortar, statuary, monument, wood, composite material, terrazzo, glass, thermoplastic sheet, thermoformed or molded article, foam sheet or article, metal, seed, painted fabric or canvas, or a combination thereof. The contacting step may occur by applying the hydrophobic compound in the form of an aqueous solution, aqueous dispersion, organic solvent solution or dispersion, or cosolvent solution or dispersion. The contacting step may occur by any conventional method, including but not limited to spraying, rolling, dip-squeeze, painting, dripping, powder coating, mixing the article in a liquid carrier of the hydrophobic compound, tumbling, or screen printing.

In one aspect, the method further comprises the step of heating the partially or completely coated article. For example, the hydrophobic agent may be applied alone or in liquid carrier, and the treated article may be heated to melt, flow, dry, or otherwise fix the hydrophobic agent onto the article surface. The final coating on the article surface will be a solidified, lasting, permanent coating. In another aspect, the method further comprises the step of solidifying the coating by drying, cooling, or allowing to cool. The liquid carrier, if used, may be dried by heating or air drying to allow for evaporation of the liquid carrier, thus leaving a permanent solid coating.

In one aspect, the contacting step occurs inside a laundry machine. Specific methods that may be used are described in US2016/0090560. For example, water is used to help disperse the coating composition, such as by a wash cycle or rinse cycle of the laundry machine. The water temperature used in the wash cycle or rinse cycle may be any temperature including cold, room temperature, warm, or hot. Methods of contacting the additive with the substrate include, but are not limited to, introducing the laundry treatment composition by pouring the treatment composition into the basin of the laundry machine, pouring the treatment composition into a detergent or treating agent reservoir of the laundry machine, adding a dissolvable pouch containing the additive composition, or adding a controlled-release reusable container containing the additive composition. Any of the above methods may also be employed using a laundry additive composition comprising two laundry treatment compositions. Alternatively, the laundry additive composition or laundry treatment composition may be introduced into an aqueous liquor and contacted with a fibrous substrate into a tub, bucket or sink, such as when washing fabrics by hand.

The method may further comprise a step of curing the hydrophobic compound with heat. Any suitable heating method may be used, such as machine drying in a dryer, ironing, steaming, blow drying, drying under a heat lamp, or drying near a radiative source of heat. In one embodiment, the cure step occurs at a temperature of about 30° C. to about 100° C. In another embodiment, the cure step occurs at a temperature of about 35° C. to about 80° C., and in another embodiment the temperature is about 40° C. to about 60° C., for a time of at least 30 minutes, preferably at least 35 minutes, and more preferably at least 40 minutes. Any drying method can be practiced, including air drying, tumbling dry, or heating the substrate to dryness. Such drying cycles are commonly found on clothes drying machines, including a tumble dry cycle, a tumble dry with heat cycle, or a heated non-tumble cycle. In one embodiment, the treated substrate is tumbled dry with heat. Such curing enhances oil-, water- and soil repellency and durability of the repellency. While these curing conditions are typical, some commercial apparatus may operate outside these ranges because of its specific design features.

In one embodiment, the articles are fibrous substrates, including fibers, textiles, paper, nonwovens, leather, fabrics, fabric blends or a combination thereof. By "fabrics" is meant natural or synthetic fabrics, or blends thereof, composed of fibers such as cotton, rayon, silk, wool, polyester, polypropylene, polyolefins, nylon, and aramids such as "NOMEX" and "KEVLAR." By "fabric blends" is meant fabric made of two or more types of fibers. Typically these blends are a combination of at least one natural fiber and at least one synthetic fiber, but also can be a blend of two or more natural fibers or of two or more synthetic fibers.

In one aspect, the article is a solid proppant particle or inorganic oxide particle. The solid proppant or inorganic oxide particle may be coated by any suitable method known to one skilled in the art. One suitable method includes mixing the hydrophobic compound overnight with water at a pH of 5. The solid proppant is then contacted with the liquid hydrophobic compound dispersion and mixed by roll-mill for 5 minutes. The surface-treated proppant is then separated from the excess liquid and dried in an oven at 100° C. to provide a solid surface-treated proppant. Proppant materials to be surface-treated include but are not limited to sand, thermoplastic particles, alumina particles, glass bubble or glass bead particles, and clay particles. Preferably, the proppant material is sand. The surface-treated proppants or surface-treated inorganic oxide particles of the present invention have a mesh size of at least 100 (up to and including 149 micrometers).

Specifically, the treated articles of the present invention are useful to provide enhanced surface properties, especially durability of oil-, water- and soil-repellency, while reducing or eliminating the amount of fluorinated compounds employed. The repellency property is effective with a variety of other surface effects.

Test Methods

All solvents and reagents, unless otherwise indicated, were purchased from Sigma-Aldrich, St. Louis, Mo., and used directly as supplied. Sorbitan tristearate, sorbitan trilaurate, and 50:50 sorbitan tribehenate:sorbitan tristearate blend are available from DuPont Nutrition & Health, Copenhagen, Denmark. Decaglycerol decaoleate is available from Lonza, Allendale, N.J. Sorbitan trioleate is available from Oleon, Ghent, Belgium.

ARMEEN DM-18D was obtained from Akzo-Nobel, Bridgewater, N.J. PHOBOL XAN was obtained from Huntsman Corp, Salt Lake City, Utah.

STEPOSOL SB-W was obtained from Stepan, Northfield, Ill. VMA-70 is available from NOF Corporation.

CHEMIDEX S is a stearaminopropyl dimethylamine surfactant available from Lubrizol, Wickliffe, Ohio.

ETHAL LA-4 is an ethoxylated emulsifier available from Ethox Chemicals, Greenville, S.C.

CAPSTONE 62-MA and ZELAN R3 are available from The Chemours Company, Wilmington, Del.

PLURONIC L-35 is available from BASF, Florham Park, N.J.

The following tests were employed in evaluating the examples herein.

Test Method 1—Fabric Treatment

The fabrics treated in this study were 100% by weight polyester fabric available from L. Michael OY, Finland or 100% by weight nylon fabric available from Huntsman Corp, Salt Lake City, Utah. The fabric was treated with the aqueous dispersions of hydrophobic compounds and surface effect polymers using a conventional pad bath (dipping) process. The prepared concentrated dispersions were diluted with deionized water to achieve a pad bath having 60 g/L of the final emulsion in the bath. For the treatment of the cotton fabric, a wetting agent, INVADINE PBN and a catalyzed cross-linking agent, KNITTEX 7636 (all available from Huntsman, Salt Lake City, Utah) were also included in the bath at 5 g/L and 30 g/L respectively. The fabric was padded in the bath, and the excess liquid was removed by squeeze rollers. The wet pickup was around 95% on the cotton substrate. The "wet pick up" is the weight of the bath solution of the emulsion polymer and additives applied to the fabric, based on the dry weight of the fabric. The fabric was cured at approximately 165° C. for 3 minutes and allowed to "rest" after treatment and cure for at least 2 hours.

For the treatment of the polyester fabric, a wetting agent, INVADINE® PBN (available from Huntsman, Charlotte, N.C., USA) and 60% acetic acid were also included in the bath at 5 g/L and 1 g/L respectively. The fabric was padded in the bath, and the excess liquid removed by squeeze rollers. The wet pickup was around 55% on the polyester substrate. The "wet pick up" is the weight of the bath solution of the emulsion polymer and additives applied to the fabric, based on the dry weight of the fabric. The fabric was cured at approximately 160° C. for 2 minutes and allowed to "rest" after treatment and cure for about 15 to about 18 hours.

Test Method 2—Water Drop Rating

The water repellency of a treated textile substrate was measured according to AATCC standard Test Method No. 193 and the method outlined in the *Teflon® Global Specifications and Quality Control Tests* booklet. The higher the water drop rating, the better the resistance the finished substrate has to staining by water-based substances.

Test Method 3—Water Spray Repellency

Water repellency was further tested by utilizing the spray test method which is a measure of dynamic water repellency. The treated fabric samples were tested for water repellency according to AATCC standard Test Method No. 22 and the method outlined in the *Teflon® Global Specifications and Quality Control Tests* booklet. A rating of 90 denotes slight random sticking or wetting without penetration; lower values indicate progressively greater wetting and penetration.

Test Method 4—Oil Rating

The treated fabric samples were tested for oil repellency by a modification of AATCC standard Test Method No. 118, and the method outlined in the *Teflon® Global Specifications and Quality Control Tests* booklet. The higher the oil drop rating, the better the resistance the finished substrate has to staining by oil-based substances.

Test Method 5—Bundesmann Absorbency (ABS)

The treated fabric samples were tested for dynamic water absorbency following ISO 9865 standard Test Method.

Test Method 6—Wash Durability

The fabric samples were laundered according to International Standard specified domestic washing procedure for textile testing. Fabric samples were loaded into a horizontal drum, front-loading type (Type A, WASCATOR FOM 71MP-Lab) of automatic washing machine with a ballast load to give a total dry load of 4 lb. A commercial detergent was added (AATCC 1993 standard Reference Detergent WOB) and the washer program 6N was used to simulate 20 home washes (20HW) or 30 home washes (30HW). After washing was complete, the entire load was placed into a KENMORE automatic dryer and dried on high for 45-50 min.

EXAMPLES

Examples 1-6 and Comparative Examples A-D

Partially fluorinated polymer repellents are synthesized via emulsion polymerization, in the presence of hydrophobic compounds at 20 weight % of the total monomer weight. The hydrophobic compounds are listed in Table 1. Water (260 g), ARMEEN DM 18D (5.09 g), acetic acid (3.18 g), TERGITOL TMN-10 (2.55 g), dipropylene glycol (24.17 g), STEPOSOL SB-W (Steposol, 1.91 g), stearic acid (0.013), and the hydrophobic compound (26.69 g) are weighed into a beaker and stirred at 60° C. until all the components are dissolved. This mixture is transferred to a plastic bottle, and CAPSTONE 62-MA (85.57 g), 7-EO methacrylate (1.57 g), VMA-70 (43.45 g), hydroxyethyl methacrylate (1.62 g), and dodecyl mercaptan (0.83 g) are weighed into the bottle. The mixture is premixed with a Janke & Kunkel IKA-WERK Ultra Turrax homogenizer/immersion blender for 1 minute immediately before homogenizing for 8 passes at 4350 psi (or until absorbance value was <0.25 A.U.). The homogenized material is charged into a 500 mL jacketed reactor with a temperature controller, overhead stirrer, and condenser with nitrogen line. The reaction mixture is sparged with nitrogen for 20 minutes. When the temperature of the mixture is below 30° C., VAZO 56 (0.40 g) is added and the reaction mixture is heated from 28° C. to 55° C. over 30 minutes. The reaction is held at 55° C. for 8 hours. The product is filtered through a 25 mm filter and solids are measured. Products are padded on polyester at 45 g/L of the fluorinated acrylic with 5 g/L INVADINE PBN, 1 g/L 60% acetic acid, and, in some cases, PHOBOL XAN. Samples are tested according to Test Methods 1-6.

Comparative Examples E-F

The procedure for Examples 1-10 is repeated according to Table 1, without the addition of the hydrophobic compound.

TABLE 1

Composition of Examples 1-6 and Comparative Examples A-F

| Example | Hydrophobic compound | g/L PHOBOL XAN |
|---|---|---|
| 1 | Sorbitan tristearate | 0 |
| 2 | Sorbitan tristearate | 10 |
| 3 | 50:50 blend of sorbitan tribehenate and sorbitan tristearate | 0 |
| 4 | 50:50 blend of sorbitan tribehenate and sorbitan tristearate | 10 |
| 5 | Sorbitan trilaurate | 0 |
| 6 | Sorbitan trilaurate | 10 |
| A | Decaglycerol decaoleate | 0 |
| B | Decaglycerol decaoleate | 10 |
| C | Sorbitan trioleate | 0 |
| D | Sorbitan trioleate | 10 |
| E | N/A | 0 |
| F | N/A | 10 |

TABLE 2

Performance of Examples 1-6 and Comparative Examples A and B on 100% Polyester Fabric

| | Water Drop | | Oil Rating | | Spray Rating | | |
|---|---|---|---|---|---|---|---|
| Ex. | Initial | 20HW (60° C.) | Initial | 20HW (60° C.) | Initial | 20HW (60° C.) | ABS % |
| E | 9 | 7 | 5 | 3 | 100 | 80 | 10.8 |
| F | 9 | 9 | 6 | 5 | 100 | 95 | 15.9 |
| 1 | 10 | 6 | 5.5 | 2 | 100 | 75 | 12.9 |
| 2 | 10 | 7 | 5.5 | 4 | 100 | 90 | 4.1 |
| 3 | 9 | 6 | 5 | 2 | 100 | 90 | 8.2 |
| 4 | 9 | 7 | 5 | 4 | 100 | 95 | 3.3 |
| 5 | 10 | 6 | 5.5 | 2 | 100 | 70 | 7.0 |
| 6 | 10 | 8 | 5.5 | 4 | 100 | 80 | 3.4 |
| A | 10 | 6 | 5 | 1 | 100 | 70 | 15.6 |
| B | 10 | 6 | 5 | 2.5 | 100 | 80 | 17.1 |
| C | 9 | 6 | 5 | 1 | 100 | 70 | 19.6 |
| D | 10 | 7 | 5 | 2.5 | 100 | 80 | 15.5 |

The results indicate that the hydrophobic compounds maintain or extend the static water repellency and durable dynamic water repellency performance of partially fluorinated copolymer dispersions, while exhibiting fluorine efficiency.

Example 7

Into a 4-neck round bottom flask equipped with an overhead stirrer, thermocouple and condenser is added sorbitan tristearate (111 g) and 4-methyl-2-pentanone (MIBK, 274 g). The solution is heated to 80° C. An aqueous dispersion is then prepared by adding warm water (512 g), CHEMIDEX S (2.4 g), ETHAL LA-4 (3.2 g) and acetic acid (1.6 g) at 65° C. The mixture is immersion blended (2 min), homogenized at 6000 psi, and the resulting dispersion is distilled under reduced pressure to remove the solvent and yield a non-flammable dispersion at 13.15% solids after cooling and filtering. The resulting dispersion is blended with the fluorinated acrylic of Comparative Example A in a ratio of 18.31% by weight hydrophobic compound:81.69% by weight of fluorinated acrylic polymer, applied to the fabric at 45 g/L of the fluorinated acrylic with 5 g/L of INVADINE PBN and 1 g/L of 60% acetic acid, and tested according to the test methods above.

Example 8

Example 7 is repeated, adding 10 g/L of PHOBOL XAN to the pad bath.

TABLE 3

Performance of Examples 7-8

| | Water Drop | | Oil Rating | | Spray Rating | | |
|---|---|---|---|---|---|---|---|
| Ex. | Initial | 20HW (60° C.) | Initial | 20HW (60° C.) | Initial | 20HW (60° C.) | ABS % |
| 100% Polyester | | | | | | | |
| 7 | 8 | 8 | 5 | 4 | 100 | 100 | 11.8 |
| 8 | 9 | 9 | 5 | 5 | 100 | 100 | 10.5 |
| Nylon | | | | | | | |
| 7 | 9 | 9 | 5 | 5 | 100 | 100 | 22.7 |
| 8 | 9 | 9 | 5 | 5 | 100 | 100 | 20.2 |

Comparative Examples G-H

Samples are padded with CAPSTONE TC-A, 5 g/L INVADINE PBN, 1 g/L 60% acetic acid, and 10 g/L of PHOBOL XAN according to Table 7. Samples are tested according to Test Methods 1-6.

Comparative Examples I-J

Water (333 g), ARMEEN DM 18D (8.43 g), acetic acid (5.27 g), TERGITOL TMN-10 (4.22 g), dipropylene glycol (40.04 g), STEPOSOL SB-W (Stepan, 3.16 g), SILTECH TC11-58B (15.61 g) and stearic acid (0.022) are weighed into a beaker and stirred at 60° C. until all the components are dissolved. This mixture is transferred to a plastic bottle, and CAPSTONE 6,2-FMA (178.11 g), 7-EO methacrylate (2.59 g), stearyl methacrylate (29.19), VMA-70 (6.36 g), hydroxyethyl methacrylate (2.68 g), 2-ethylhexyl methacrylate (0.23 g) and dodecyl mercaptan (1.37 g) are weighed into the bottle. The mixture is premixed with a Janke & Kunkel IKA-WERK Ultra Turrax homogenizer/immersion blender for 1 minute immediately before homogenizing for 8 passes at 4350 psi (or until absorbance value was <0.25 A.U.). The homogenized material is charged into a 500 mL jacketed reactor with a temperature controller, overhead stirrer, and condenser with nitrogen line. The reaction mixture is sparged with nitrogen for 20 minutes. When the temperature of the mixture is below 30° C., VAZO 56 (0.66 g) is added and the reaction mixture is heated from 28° C. to 55° C. over 30 minutes. The reaction is held at 55° C. for 8 hours. The product is filtered through a 25 mm filter and solids are measured and adjusted to 32% to form Product I. Products are padded with the resulting product, 5 g/L INVADINE PBN, 1 g/L 60% acetic acid and 10 g/L PHOBOL XAN according to Table 7. Samples are tested according to Test Methods 1-6.

Examples 9-44

Into a 4-neck round bottom flask equipped with an overhead stirrer, thermocouple, and condenser was added 2-ethylhexyl methacrylate (48 g), dodecyl mercaptan (0.07 g) and sorbitan tristearate (63.2 g). The solution was heated to 55° C. An aqueous dispersion was then prepared by adding warm water (290 g), ARMEEN DM 18D (1.35 g), glacial acetic acid (1.8 g), 2% sodium chloride solution (2.9 g), dipropylene glycol (18 g), EHAL LA-4 (0.2 g), PLURONIC L-35 (0.65 g), white mineral oil (2.25 g), and 7-EO methacrylate (13.4 g) at 55° C. The mixture was stirred, homogenized at 6000 psi, and the resulting dispersion was returned to the round bottom flask. The dispersion was sparged with nitrogen for 30 minutes while heating to 70° C. While heating, 48 wt % N-(hydroxymethyl) acrylamide solution in water (0.5 g) was added and allowed to stir for 30 minutes. VAZO 56 (0.12 g) was added to the reactor and the reactor was held at 70° C. for 4 hours. Additional PLURONIC L-35 (1.55 g) was added, the product was cooled and filtered, and the solids were adjusted to 20% solids to form a hydrophobic compound dispersion. Products are padded with the resulting product, 5 g/L INVADINE PBN, 1 g/L 60% acetic acid and 10 g/L PHOBOL XAN according to Table 4. Samples are tested according to Test Methods 1-6.

TABLE 4

Composition of Examples 9-40 and Comparative Examples G-J

| Example | PHOBOL XAN Loading | Additive Loading | Additive Composition Ratio | | |
|---|---|---|---|---|---|
| | | | CAPSTONE TC-A | Product I | Hydrophobic compound dispersion |
| G | — | 45 g/L | 100 | — | — |
| H | 10 g/L | 45 g/L | 100 | — | — |
| I | — | 45 g/L | — | 100 | — |
| J | 10 g/L | 45 g/L | — | 100 | — |
| 9 | — | 45 g/L | 30 | — | 70 |
| 10 | 10 g/L | 45 g/L | 30 | — | 70 |
| 11 | — | 45 g/L | — | 27.4 | 72.6 |
| 12 | 10 g/L | 45 g/L | — | 27.4 | 72.6 |
| 13 | — | 60 g/L | 22.6 | — | 77.4 |
| 14 | 10 g/L | 60 g/L | 22.6 | — | 77.4 |
| 15 | — | 60 g/L | — | 20.5 | 79.5 |
| 16 | 10 g/L | 60 g/L | — | 20.5 | 79.5 |
| 17 | — | 90 g/L | 15 | — | 85 |
| 18 | 10 g/L | 90 g/L | 15 | — | 85 |
| 19 | — | 90 g/L | — | 13.7 | 86.3 |
| 20 | 10 g/L | 90 g/L | — | 13.7 | 86.3 |
| 21 | — | 45 g/L | 22.6 | — | 77.4 |
| 22 | 10 g/L | 45 g/L | 22.6 | — | 77.4 |
| 23 | — | 45 g/L | — | 20.5 | 79.5 |
| 24 | 10 g/L | 45 g/L | — | 20.5 | 79.5 |
| 25 | — | 45 g/L | 15 | — | 85 |
| 26 | 10 g/L | 45 g/L | 15 | — | 85 |
| 27 | — | 45 g/L | — | 13.7 | 86.3 |
| 28 | 10 g/L | 45 g/L | — | 13.7 | 86.3 |
| 29 | — | 45 g/L | 45 | — | 55 |
| 30 | 10 g/L | 45 g/L | 45 | — | 55 |
| 31 | — | 45 g/L | — | 41 | 59 |
| 32 | 10 g/L | 45 g/L | — | 41 | 59 |
| 33 | — | 45 g/L | 37.6 | — | 62.4 |
| 34 | 10 g/L | 45 g/L | 37.6 | — | 62.4 |
| 35 | — | 45 g/L | — | 34.2 | 65.8 |
| 36 | 10 g/L | 45 g/L | — | 34.2 | 65.8 |
| 37 | — | 45 g/L | 7.5 | — | 92.5 |
| 38 | 10 g/L | 45 g/L | 7.5 | — | 92.5 |
| 39 | — | 45 g/L | — | 10 | 90 |
| 40 | 10 g/L | 45 g/L | — | 10 | 90 |

TABLE 5

Performance of Examples 9-28 and Comparative Examples G-J on a Cotton Substrate

| Ex. | Water Drop Rating | | Oil Drop Rating | | Spray Rating | | ABS % Initial |
|---|---|---|---|---|---|---|---|
| | Initial | 20HW (40° C.) | Initial | 20 HW (40° C.) | Initial | 20 HW (40° C.) | |
| G | 11 | 9 | 6 | 4 | 100 | 90 | 24.7 |
| H | 11 | 10 | 6 | 5 | 100 | 100 | 11.7 |
| I | 11 | 8 | 6 | 2 | 100 | 90 | 22.7 |
| J | 11 | 10 | 6 | 5 | 100 | 100 | 17.7 |
| 9 | 11 | 10 | 6 | 6 | 100 | 100 | 17.5 |
| 10 | 11 | 10 | 6 | 6 | 100 | 100 | 10.5 |
| 11 | 11 | 10 | 6 | 6 | 100 | 100 | 18.6 |
| 12 | 11 | 10 | 6 | 6 | 100 | 100 | 13.2 |
| 13 | 11 | 9 | 6 | 5 | 100 | 90 | 18.8 |
| 14 | 11 | 10 | 6 | 6 | 100 | 100 | 11.8 |
| 15 | 11 | 9 | 6 | 5 | 100 | 90 | 16.4 |
| 16 | 11 | 10 | 6 | 6 | 100 | 100 | 13.2 |
| 17 | 11 | 9 | 6 | 5 | 100 | 90 | 21.5 |
| 18 | 11 | 10 | 6 | 6 | 100 | 100 | 13.8 |
| 19 | 10 | 9 | 6 | 5 | 100 | 90 | 18.3 |
| 20 | 10 | 9 | 6 | 6 | 100 | 100 | 13.6 |
| 21 | 11 | 9 | 6 | 5 | 100 | 90 | 19.0 |
| 22 | 11 | 10 | 6 | 6 | 100 | 100 | 14.7 |
| 23 | 11 | 9 | 6 | 5 | 100 | 90 | 17.0 |
| 24 | 11 | 10 | 6 | 6 | 100 | 100 | 12.3 |
| 25 | 9 | 9 | 6 | 5 | 100 | 90 | 18.4 |
| 26 | 9 | 9 | 6 | 6 | 100 | 100 | 18.7 |
| 27 | 9 | 9 | 6 | 5 | 100 | 90 | 18.0 |
| 28 | 9 | 9 | 6 | 6 | 100 | 100 | 16.4 |

TABLE 6

Performance of Examples 9-12, 21-40, and Comparative Examples G-J on a Polyester Substrate

| Ex. | Water Drop Rating | | Oil Drop Rating | | Spray Rating | | ABS % Initial |
|---|---|---|---|---|---|---|---|
| | Initial | 20HW (40° C.) | Initial | 20 HW (40° C.) | Initial | 20 HW (40° C.) | |
| G | 9 | 7 | 5 | 4 | 100 | 100 | 1.9 |
| H | 9 | 8 | 5 | 4 | 100 | 100 | 1.7 |
| I | 9 | 8 | 5 | 4 | 100 | 100 | 3.1 |
| J | 9 | 8 | 9 | 4 | 100 | 100 | 2.0 |

TABLE 6-continued

Performance of Examples 9-12, 21-40, and Comparative Examples G-J on a Polyester Substrate

| Ex. | Water Drop Rating Initial | Water Drop Rating 20HW (40° C.) | Oil Drop Rating Initial | Oil Drop Rating 20 HW (40° C.) | Spray Rating Initial | Spray Rating 20 HW (40° C.) | ABS % Initial |
|---|---|---|---|---|---|---|---|
| 29 | 9 | 8 | 5 | 4.5 | 100 | 100 | 3.9 |
| 30 | 9 | 8 | 5 | 4.5 | 100 | 100 | 0.6 |
| 31 | 9 | 8 | 5 | 4.5 | 100 | 100 | 2.2 |
| 32 | 9 | 8 | 5 | 4.5 | 100 | 100 | 0.7 |
| 33 | 9 | 8 | 5 | 4.5 | 100 | 100 | 3.4 |
| 34 | 9 | 8 | 5 | 4.5 | 100 | 100 | 1.7 |
| 35 | 9 | 8 | 5 | 4.5 | 100 | 100 | 2.4 |
| 36 | 9 | 8 | 5 | 4.5 | 100 | 100 | 0.5 |
| 9 | 9 | 8 | 5 | 4.5 | 100 | 100 | 4.5 |
| 10 | 9 | 8 | 5 | 4.5 | 100 | 100 | 1.9 |
| 11 | 9 | 8 | 5 | 4.5 | 100 | 100 | 5.4 |
| 12 | 9 | 8 | 5 | 4.5 | 100 | 100 | 0.9 |
| 21 | 9 | 8 | 5 | 4 | 100 | 100 | 6.0 |
| 22 | 9 | 8 | 5 | 4.5 | 100 | 100 | 3.4 |
| 23 | 9 | 8 | 5 | 4 | 100 | 100 | 7.0 |
| 24 | 9 | 8 | 5 | 4.5 | 100 | 100 | 1.0 |
| 25 | 9 | 7 | 5 | 4 | 100 | 100 | 6.5 |
| 26 | 9 | 8 | 5 | 4.5 | 100 | 100 | 4.4 |
| 27 | 8 | 7 | 5 | 4 | 100 | 100 | 7.0 |
| 28 | 8 | 7 | 5 | 4.5 | 100 | 100 | 6.0 |
| 37 | 9 | 7 | 3 | 2 | 100 | 100 | 8.6 |
| 38 | 9 | 8 | 3 | 3 | 100 | 100 | 6.8 |
| 39 | 6 | 6 | 3 | 2 | 100 | 100 | 14.7 |
| 40 | 6 | 6 | 3 | 3 | 100 | 100 | 10.1 |

TABLE 7

Performance of Examples 9-12, 21-40, and Comparative Examples G-J on a Nylon Substrate

| Ex. | Water Drop Rating Initial | Water Drop Rating 20 HW (40° C.) | Oil Drop Rating Initial | Oil Drop Rating 20 HW (40° C.) | Spray Rating Initial | Spray Rating 20 HW (40° C.) | ABS % Initial |
|---|---|---|---|---|---|---|---|
| G | 11 | 10 | 6 | 6 | 100 | 100 | 14.8 |
| H | 11 | 10 | 6 | 6 | 100 | 100 | 2.7 |
| I | 11 | 10 | 6 | 5 | 100 | 100 | 13.2 |
| J | 11 | 10 | 6 | 5 | 100 | 100 | 3.1 |
| 29 | 11 | 11 | 6 | 6 | 100 | 100 | 15.4 |
| 30 | 11 | 11 | 6 | 6 | 100 | 100 | 3.3 |
| 31 | 11 | 11 | 6 | 6 | 100 | 100 | 9.0 |
| 32 | 11 | 11 | 6 | 6 | 100 | 100 | 1.5 |
| 33 | 11 | 11 | 6 | 6 | 100 | 100 | 16.1 |
| 34 | 11 | 11 | 6 | 6 | 100 | 100 | 3.2 |
| 35 | 11 | 11 | 6 | 6 | 100 | 100 | 11.3 |
| 36 | 11 | 11 | 6 | 6 | 100 | 100 | 2.2 |
| 9 | 11 | 10 | 6 | 6 | 100 | 100 | 18.9 |
| 10 | 11 | 11 | 6 | 6 | 100 | 100 | 5.2 |
| 11 | 11 | 11 | 6 | 6 | 100 | 100 | 19.5 |
| 12 | 11 | 11 | 6 | 6 | 100 | 100 | 2.7 |
| 21 | 11 | 10 | 6 | 6 | 100 | 100 | 17.4 |
| 22 | 11 | 11 | 6 | 6 | 100 | 100 | 4.0 |
| 23 | 11 | 11 | 6 | 6 | 100 | 100 | 19.4 |
| 24 | 11 | 11 | 6 | 6 | 100 | 100 | 4.6 |
| 25 | 11 | 10 | 6 | 6 | 100 | 100 | 18.8 |
| 26 | 11 | 11 | 6 | 6 | 100 | 100 | 10.8 |
| 27 | 11 | 11 | 6 | 6 | 100 | 100 | 22.1 |
| 28 | 11 | 11 | 6 | 6 | 100 | 100 | 13.2 |
| 37 | 10 | 9 | 5 | 5 | 100 | 90 | 22.7 |
| 38 | 10 | 10 | 5 | 5 | 100 | 100 | 17.4 |
| 39 | 7 | 7 | 4 | 4 | 100 | 100 | 36.4 |
| 40 | 7 | 7 | 4 | 4 | 100 | 100 | 25.2 |

Examples 41-46

Partially fluorinated polymer repellents are synthesized via emulsion polymerization, in the presence of sorbitan tristearate at 0-50 weight % of the total monomer and hydrophobic compound weight. The ratios of active hydrophobic compound to fluorinated acrylic are listed in Table 8.

Water (340 g), ARMEEN DM 18D (0.45 g), acetic acid (0.28 g), ETHAL LA-4 (1.10 g), dipropylene glycol (17.25 g), STEPOSOL SB-W (Steposol, 1.71 g), stearic acid (0.01), and sorbitan tristearate are weighed into a beaker and stirred at 60° C. until all the components are dissolved. This mixture is transferred to a plastic bottle, and CAPSTONE 62-MA (48.19 g), 7-EO methacrylate (8.20 g), SMA (7.90 g), VMA-70 (1.72 g), hydroxyethyl methacrylate (0.73 g), 2-ethylhexyl methacrylate (22.48 g), and dodecyl mercaptan (0.41 g) are weighed into the bottle. The mixture is premixed with a Janke & Kunkel IKA-WERK Ultra Turrax homogenizer/immersion blender for 1 minute before homogenizing 4350 psi (absorbance value was <0.25 A.U.). The homogenized material is charged into a 500 mL jacketed reactor with a temperature controller, overhead stirrer, and condenser with nitrogen line. The reaction mixture is heated to 70° C. while sparging with nitrogen for 20 minutes. Ethylene glycol dimethacrylate (0.06 g) and N-Methylolacrylamide (48 wt. % in water, 1.36 g) are added to the reaction mixture and stirred. VAZO 56 (0.24 g) is added and the reaction mixture is heated to 78° C. and held for 8 hours. The product is filtered through a 25 mm filter and solids are measured. Products are padded on polyester at equal loading as 50 g/L of a 6% fluorine fluorinated acrylic with 5 g/L INVADINE PBN, 1 g/L 60% acetic acid, and, in some cases, 10 g/L PHOBOL XAN. Samples are tested according to Test Methods 1-6.

Comparative Examples K-L

The procedure for Example 41 is repeated according to Table 8, without the addition of the hydrophobic compound.

TABLE 8

Composition of Examples 41-46 and Comparative Examples K-L

| Example | Weigth Ratio of Hydrophobic Compound:Fluoropolymer | g/L PHOBOL XAN |
|---|---|---|
| K | 0:100 | 0 |
| L | 0:100 | 10 |
| 41 | 30:70 | 0 |
| 42 | 30:70 | 10 |
| 43 | 50:50 | 0 |
| 44 | 50:50 | 10 |
| 45 | 10:90 | 0 |
| 46 | 10:90 | 10 |

TABLE 9

Performance of 41-46 and Comparative Examples K-L on 100% Polyester Fabric

| Ex. | Water Drop Initial | Water Drop 20HW (60° C.) | Oil Rating Initial | Oil Rating 20HW (60° C.) | Spray Rating Initial | Spray Rating 20HW (60° C.) | ABS % |
|---|---|---|---|---|---|---|---|
| K | 9 | 6 | 4.5 | 2 | 100 | 80 | 4.5 |
| L | 9 | 8 | 4.5 | 3.5 | 100 | 85 | 4.1 |
| 41 | 9 | 7 | 5 | 2 | 100 | 85 | 1.8 |
| 42 | 9 | 8 | 5 | 4.5 | 100 | 100 | 1.9 |

TABLE 9-continued

Performance of 41-46 and Comparative Examples K-L on 100% Polyester Fabric

| Ex. | Water Drop | | Oil Rating | | Spray Rating | | ABS % |
|---|---|---|---|---|---|---|---|
| | Initial | 20HW (60° C.) | Initial | 20HW (60° C.) | Initial | 20HW (60° C.) | |
| 43 | 9 | 6 | 3 | 1 | 100 | 70 | 3.6 |
| 44 | 9 | 8 | 3.5 | 3 | 100 | 100 | 3.1 |
| 45 | 9 | 6 | 5 | 2 | 100 | 80 | 1.7 |
| 46 | 10 | 9 | 5 | 5 | 100 | 100 | 0.3 |

What is claimed is:

1. A coated article comprising a complete permanent fluorinated coating on the surface of an article,
wherein the coating comprises 5 to 99% by weight of a hydrophobic compound, and 1 to 95% by weight of at least one fluorinated surface effect agent, both based on the total solids weight of the coating, wherein the hydrophobic compound is of formula (Ia):

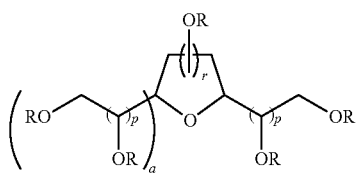

(Ia)

wherein each R is independently —H; —R$^1$; —C(O)R$^1$; —(CH$_2$CH$_2$O)$_n$(CH(CH$_3$)CH$_2$O)$_m$R$^2$; or —(CH$_2$CH$_2$O)$_n$(CH(CH$_3$)CH$_2$O)$_m$C(O)R$^1$;
each n is independently 0 to 20;
each m is independently 0 to 20;
m+n is greater than 0;
r is 1 to 3;
a is 0 or 1;
p is independently 0 to 2;
provided that a is 0 when r is 3;
each R$^1$ is independently a linear or branched alkyl group having 5 to 29 carbons;
each R$^2$ is independently a linear or branched alkyl group having 6 to 30 carbons; and
at least one R is —H and at least two R groups are a —R$^1$; —C(O)R$^1$; —(CH$_2$CH$_2$O)$_n$(CH(CH$_3$)CH$_2$O)$_m$R$^2$; or —(CH$_2$CH$_2$O)$_n$(CH(CH$_3$)CH$_2$O)$_m$C(O)R$^1$;
wherein the fluorinated surface effect agent is a hydrophobic polymer selected from the group consisting of fluorinated cationic acrylic polymers, fluorinated anionic acrylic polymers, fluorinated nonionic acrylic polymers, partially fluorinated urethanes, and mixtures thereof; and
wherein, if the fluorinated surface effect agent is a fluorinated acrylic copolymer, it is a reaction product of monomers comprising:
a) one or more fluorinated ethylenically unsaturated monomers;
b) an ethylenically unsaturated monomer having a polar or reactive group; and
c) one or more monomers selected from a second ethylenically unsaturated monomer having a polar or reactive group, or a non-fluorinated ethylenically unsaturated hydrophobic monomers excluding cyclohexyl acrylate or methyl acrylate wherein the homopolymer of hydrophobic monomer c) has a maximum glass transition temperature (T$_g$) of 45° C. and/or a maximum melt transition temperature (T$_m$) of 25° C.

2. The coated article of claim 1, where the hydrophobic compound is selected from formula (Ia) to be formula (Ia'):

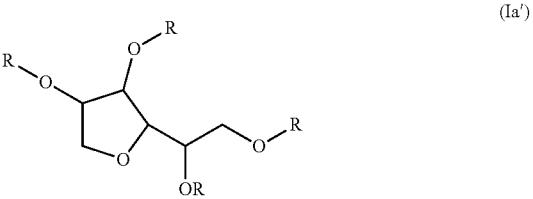

(Ia')

wherein R is further limited to independently —H; —R$^1$; or —C(O)R$^1$.

3. The coated article of claim 1, where the hydrophobic compound is selected from formula (Ia) to be formula (Ia'):

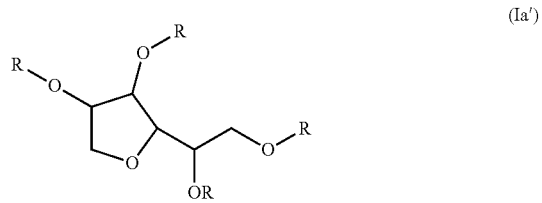

(Ia')

wherein R is further limited to independently —H; —(CH$_2$CH$_2$O)$_n$(CH(CH$_3$)CH$_2$O)$_m$R$^2$; or —(CH$_2$CH$_2$O)$_n$(CH(CH$_3$)CH$_2$O)$_m$C(O)R$^1$.

4. The coated article of claim 1, where the hydrophobic compound is substituted with at least three —R$^1$, —C(O)R$^1$, (CH$_2$CH$_2$O)$_n$(CH(CH$_3$)CH$_2$O)$_m$R$^2$, —(CH$_2$CH$_2$O)$_n$(CH(CH$_3$)CH$_2$O)$_m$C(O)R$^1$, or mixtures thereof.

5. The coated article of claim 1, wherein the surface effect is no iron, easy to iron, shrinkage control, wrinkle free, permanent press, moisture control, softness, strength, anti-slip, anti-static, anti-snag, anti-pill, stain repellency, stain release, soil repellency, soil release, water repellency, oil repellency, odor control, antimicrobial, sun protection, anti-blocking, cleanability, dust resistance, leveling, corrosion resistance, acid resistance, anti-fog, anti-ice, or tanning.

6. The coated article of claim 1, where the coating comprises 10 to 90% by weight of the hydrophobic compound, and 10 to 90% by weight of the fluorinated surface effect agent, both based on the total solids weight of the coating.

7. The coated article of claim 1, where the coating comprises 20 to 80% by weight of the hydrophobic compound, and 20 to 80% by weight of the fluorinated surface effect agent, both based on the total solids weight of the coating.

8. The coated article of claim 1 wherein the article is a fiber, textile, fabric, fabric blend, paper, nonwoven, leather, proppant particle, inorganic oxide particle, unglazed concrete, brick, tile, granite, limestone, marble, grout, mortar, statuary, monument, glass, thermoplastic sheet, thermoformed or molded article, foam sheet or article, metal, seed, painted fabric or canvas, or a combination thereof.

9. The coated article of claim 1, wherein the fluorinated surface effect agent is the fluorinated acrylic copolymer.

10. The coated article of claim 1, wherein the total solids weight of the coating consists essentially of the weight of the hydrophobic compound and the weight of the at least one fluorinated surface effect agent.

11. The coated article of claim 1, wherein the article is a fiber, textile, fabric, fabric blend, paper, nonwoven, leather, proppant particle, inorganic oxide particle, unglazed concrete, brick, granite, limestone, marble, grout, mortar, statuary, monument, glass, thermoplastic sheet, foam sheet or article, seed, painted fabric, canvas, or a combination thereof.

12. A coated article comprising a complete permanent fluorinated coating on the surface of an article,
wherein the coating comprises 5 to 99% by weight of a hydrophobic compound, and 1 to 95% by weight of at least one fluorinated surface effect agent, both based on the total solids weight of the coating, wherein the total solids weight of the coating consists of the weight of the hydrophobic compound and the weight of the at least one fluorinated surface effect agent, wherein the hydrophobic compound is selected from a cyclic or acyclic alcohol which is substituted with at least two —$R^1$, —$C(O)R^1$, —$(CH_2CH_2O)_n(CH(CH_3)CH_2O)_m R^2$, —$(CH_2CH_2O)_n(CH(CH_3)CH_2O)_m C(O)R^1$, or mixtures thereof;
where the cyclic or acyclic sugar alcohol is selected from a pentaerythritol, saccharide, reduced sugar, aminosaccharide, citric acid, aldonic acid, or aldonic acid lactone; wherein
each n is independently 0 to 20;
each m is independently 0 to 20;
m+n is greater than 0;
each $R^1$ is independently a linear or branched alkyl group having 5 to 29 carbons;
each $R^2$ is independently a linear or branched alkyl group having 6 to 30 carbons;
wherein the fluorinated surface effect agent is a hydrophobic polymer selected from the group consisting of fluorinated cationic acrylic polymers, fluorinated anionic acrylic polymers, fluorinated nonionic acrylic polymers, partially fluorinated urethanes, and mixtures thereof; and
wherein, if the fluorinated surface effect agent is a fluorinated acrylic copolymer, it is a reaction product of monomers comprising:
a) one or more fluorinated ethylenically unsaturated monomers;
b) an ethylenically unsaturated monomer having a polar or reactive group; and
c) one or more monomers selected from a second ethylenically unsaturated monomer having a polar or reactive group, or a non-fluorinated ethylenically unsaturated hydrophobic monomers excluding cyclohexyl acrylate or methyl acrylate wherein the homopolymer of hydrophobic monomer c) has a maximum glass transition temperature ($T_g$) of 45° C. and/or a maximum melt transition temperature ($T_m$) of 25° C.

13. The coated article of claim 12, where the hydrophobic compound is selected from formulas (Ia), (Ib), or (Ic):

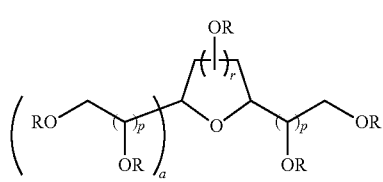

(Ia)

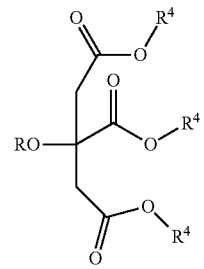

(Ib)

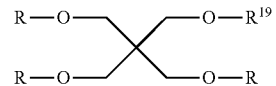

(Ic)

wherein each R is independently —H; —$R^1$; —$C(O)R^1$; —$(CH_2CH_2O)_n(CH(CH_3)CH_2O)_m R^2$, or —$(CH_2CH_2O)_n(CH(CH_3)CH_2O)_m C(O)R^1$, each n is independently 0 to 20;

each m is independently 0 to 20;

m+n is greater than 0;

r is 1 to 3;

a is 0 or 1;

p is independently 0 to 2;

provided that a is 0 when r is 3;

each $R^1$ is independently a linear or branched alkyl group having 5 to 29 carbons;

each $R^2$ is independently linear or branched alkyl group having 6 to 30 carbons;

provided when formula (Ia) is chosen, then at least one R is —H and at least two R groups are a —$R^1$; —$C(O)R^1$; —$(CH_2CH_2O)_n(CH(CH_3)CH_2O)_m R^2$; or —$(CH_2CH_2O)_n(CH(CH_3)CH_2O)_m C(O)R^1$;

each $R^4$ is independently —H, a linear or branched alkyl group having 6 to 30 carbons, or combinations thereof; —$(CH_2CH_2O)_n(CH(CH_3)CH_2O)_m R^2$; or —$(CH_2CH_2O)n(CH(CH_3)CH_2O)_m C(O)R^1$;

provided when formula (Ib) is chosen, then at least one R or $R^4$ is —H; and at least two of R or $R^4$ are a linear or branched alkyl group, or combinations thereof; —$(CH_2CH_2O)_n(CH(CH_3)CH_2O)_m R^2$; or —$(CH_2CH_2O)_n(CH(CH_3)CH_2O)_m C(O)R^1$; and each $R^{19}$ is —H, —$C(O)R^1$, or —$CH_2C[CH_2OR]_3$, provided when formula (Ic) is chosen, then at least one $R^{19}$ or R is —H; and at least two of $R^{19}$ or R are —$C(O)R^1$, —$(CH_2CH_2O)_n(CH(CH_3)CH_2O)_m R^2$; or —$(CH_2CH_2O)_n(CH(CH_3)CH_2O)_m C(O)R^1$.

14. The coated article of claim 13, where the hydrophobic compound is selected from formula (Ib).

15. A method of imparting a surface effect to an article comprising contacting the surface of the article with a fluorinated coating to form a permanent completely coated article,
wherein the coating comprises 5 to 99% by weight of a hydrophobic compound, and 1 to 95% by weight of at least one fluorinated surface effect agent, both based on the total solids weight of the coating, wherein the hydrophobic compound is of formula (Ia):

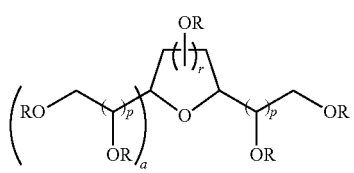

(Ia)

wherein each R is independently —H; —R$^1$; —C(O)R$^1$; —(CH$_2$CH$_2$O)$_n$(CH(CH$_3$)CH$_2$O)$_m$R$^2$; or —(CH$_2$CH$_2$O)$_n$(CH(CH$_3$)CH$_2$O)$_m$C(O)R$^1$:
each n is independently 0 to 20;
each m is independently 0 to 20;
m+n is greater than 0;
r is 1 to 3;
a is 0 or 1;
p is independently 0 to 2;
provided that a is 0 when r is 3;
each R$^1$ is independently a linear or branched alkyl group having 5 to 29 carbons;
each R$^2$ is independently a linear or branched alkyl group having 6 to 30 carbons; and
at least one R is —H and at least two R groups are a —R$^1$; —C(O)R$^1$; —(CH$_2$CH$_2$O)$_n$(CH(CH$_3$)CH$_2$O)$_m$R$^2$; or —(CH$_2$CH$_2$O)$_n$(CH(CH$_3$)CH$_2$O)$_m$C(O)R$^1$;
wherein the fluorinated surface effect agent is a hydrophobic polymer selected from the group consisting of fluorinated cationic acrylic polymers, fluorinated anionic acrylic polymers, fluorinated nonionic acrylic polymers, partially fluorinated urethanes, and mixtures thereof; and
wherein, if the fluorinated surface effect agent is a fluorinated acrylic copolymer, it is a reaction product of monomers comprising:
a) one or more fluorinated ethylenically unsaturated monomers;
b) an ethylenically unsaturated monomer having a polar or reactive group; and
c) one or more monomers selected from a second ethylenically unsaturated monomer having a polar or reactive group, or a non-fluorinated ethylenically unsaturated hydrophobic monomers excluding cyclohexyl acrylate or methyl acrylate wherein the homopolymer of hydrophobic monomer c) has a maximum glass transition temperature (T$_g$) of 45° C. and/or a maximum melt transition temperature (T$_m$) of 25° C.

16. The method of claim 15, further comprising the step of heating the completely coated article.

17. The method of claim 15, further comprising the step of solidifying the coating by drying, cooling, or allowing to cool.

18. The method of claim 15, where the step of contacting is by spraying, rolling, dip-squeeze, painting, sprinkling, dripping, powder coating, mixing the article in a liquid carrier of the hydrophobic compound, tumbling, or screen printing.

* * * * *